ELECTRICAL SIGNAL SWITCHING DEVICE

Filed April 2, 1963

2 Sheets-Sheet 1

INVENTOR.
Tsuyoshi Takafuji
BY
Hill, Sherman, Meroni, Gross & Simpson
ATTORNEYS

INVENTOR.
Tsuyoshi Takafuji
BY
Hill, Sherman, Meroni, Gross & Simpson
ATTORNEYS

United States Patent Office 3,273,047

Patented Sept. 13, 1966

3,273,047

ELECTRICAL SIGNAL SWITCHING DEVICE

Tsuyoshi Takafuji, Musashino-shi, Tokyo, Japan, assignor to Kabushikikaisha Yokogawa Denki Seisakusho (Yokogawa Electric Works Ltd.), Tokyo, Japan, a corporation of Japan Filed Apr. 2, 1963, Ser. No. 270,062
Claims priority, application Japan, Apr. 10, 1962, 37/14,301
3 Claims. (Cl. 321—48)

This invention relates to a switching device provided with plurality of pairs of input terminals and a pair of output terminals in which direct current signals respectively applied to the input terminals are selected and transmitted to the output terminals, and is more particularly concerned with a change-over switching device in which the selected direct current signals are converted into alternating current signals at the same time when selected and the converted signals are transmitted to the output terminals.

In a process data proceeding device used in the industrial process art or in an automatic control device of industrial process computer control system, electrical signals (analog signals) such that many physical variations, for example temperature, pressure, flow quantity and so on relative to the process condition are converted into quantity of electricity, are usually converted into electrical digital signals to effect recording, operation and the like. However, the signals obtained by converting the physical variations are usually direct current signals of a low level and a signal polarity or direct current that the polarity is inverted occasionally, and these direct current signals must be amplified to be energized up to a relatively high level so as to convert these direct current analog signals into electrical digital signals. In order to amplify many kinds of direct current signals of low level, it has been heretofore used that a device in such a system that many kinds of direct current signals are selected successively and applied to the input terminal of a single direct current amplifier which, in turn, amplifies these direct current signals successively. In such a device, a switching circuit is usually employed which is provided with semiconductor switching elements such as transistors for effecting automatic switching. However, there are many technical problems left unsettled for putting the device of this system into practical use. That is, an efficient switching circuit is difficult to obtain, and since signals produced in the output of this switching circuit are direct current rectangular wave signals of low level, a direct current amplifier of high gain is required to amplify them faithfully, which is difficult to carry out and makes the device expensive.

Accordingly, a principal object of this invention is to provide a novel signal switching device which is simple in circuit structure and cheap in price.

Another object of this invention is to provide a novel signal switching device in which particular input signals are selected from a lot of electrical signal groups by the command from a computer or the like and the selected signals may be converted into alternating signals at the same time.

A further object of this invention is to provide an improved novel chopper circuit in which various troubles may be removed, which are caused due to outside driving signals in the conversion of direct current signals of low level into alternating signals, a plurality of chopper circuits being arranged in transmission lines.

A still further object of this invention is to provide an amplifier circuit of such a type that many kinds of signals converted into alternating signals by a single alternating current amplifier having a tuning circuit for the driving frequency of a chopper circuit in place of the above direct current amplifier, are amplified successively.

Other objects, features and advantages of this invention will become apparent from the following description taken in conjunction with the accompanying drawings, in which.

Figure 1:
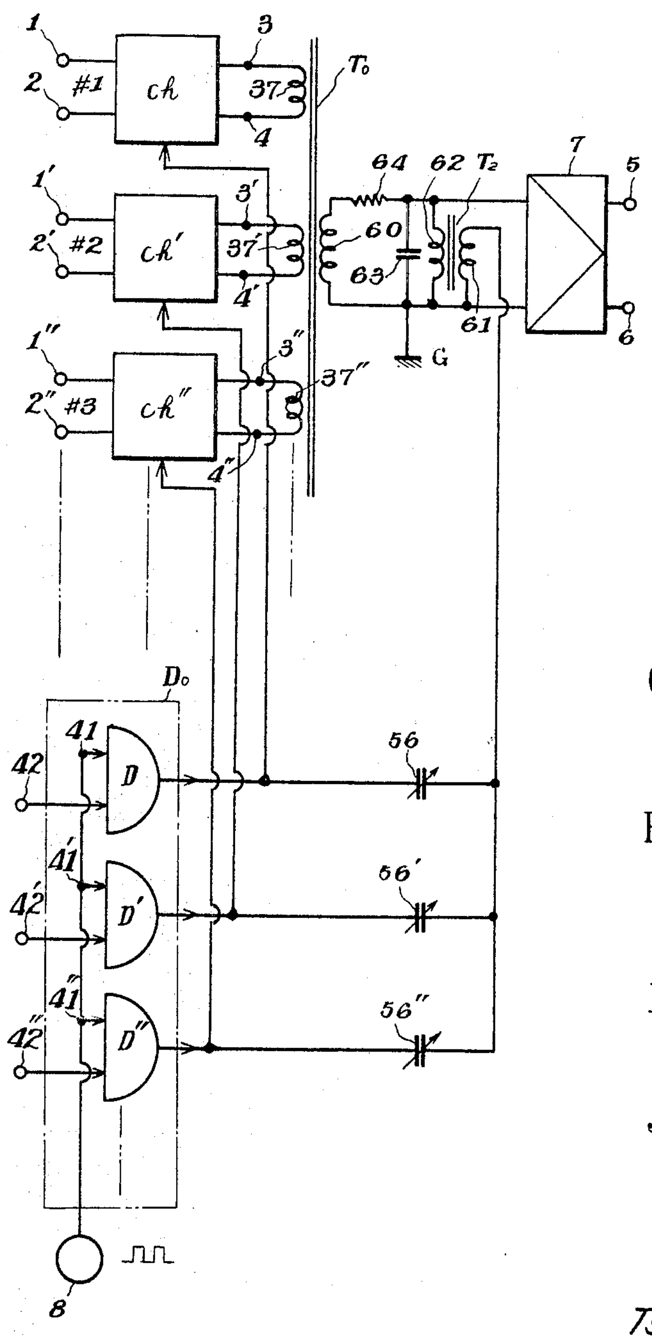
FIGURE 1 is a block diagram illustrating an example of this invention.

Referring to FIGURE 1, #1, #2, #3 . . . are transmission lines of electric signals, and electric signals corresponding to industrial physical variations such as temperature, pressure, flow quantity and so on are supplied respectively across input terminals 1–2, 1′–2′, 1″–2″ . . . by a transmitter (not shown). In this case, the electric signals are limited to direct current signals of a single polarity, for example unidirectional voltage signals which vary in a range from 0 to 10 mv., and for the sake of simplicity no explanation will be made in connection with the case of direct current signals each of the polarity of which is inverted at random. *Ch, ch′, ch″* . . . are chopper circuits which have been inserted in the respective transmission lines #1, #2, #3 . . . . $T_0$ is an output transformer which is provided with a plurality of primary coils 37, 37′, 37″ . . . wound on the same core and a secondary coil 60, and the primary coils 37, 37′, 37″ . . . are connected respectively to the output terminals 3–4, 3′–4′, 3″–4″ . . . of the chopper circuits. On the other hand, signal voltages for separately driving the chopper circuits *ch, ch′, ch″* . . . are supplied from a rectangular wave power source 8 through a distributing circuit $D_0$ including respective gate circuits. That is, respectively to the input terminals 41, 41′, 41″ . . . of the gate circuits D, D′, D″ . . . , output signals of, for example 5KC from the rectangular wave power source 8 are impressed in common, and to the other input terminals 42, 42′, 42″ . . . are impressed selective command signals from a computer or the like (not shown). One of the selective command signal is impressed to only one input terminal at some time, which signal is a pulse having a certain width, for example corresponding to 5 ms., and only one gate circuit corresponding to the input terminal becomes conductive for the duration of the pulse width. Accordingly, the output driving signals from the rectangular wave power source 8 are respectively introduced through respective gate circuits each of which has been made conductive and into one of the chopper circuits to drive it. Thus, the direct current signal supplied to one of the transmission lines is converted into alternating signal having an amplitude and a phase in response to its amount and polarity by the operation of the chopper circuit, thus the converted signals are taken out at the secondary coil 60 in the form of alternating current signals through the output transformer $T_0$. Between the both ends of the secondary coil 60 is connected a parallel of a capacitor 63 and a secondary coil 62 of a transformer $T_2$ through a series resistor 64 and an input circuit of an alternating current amplifier 7 is connected thereto. By an LC resonance circuit (its resonance frequency being made to be the same as the output frequency of the power source) which is composed of an inductance of the transformer $T_2$ and a capacitance of the capacitor 63, only the fundamental wave components at the same frequency as the driving frequency of the chopper circuits are taken out from alternating signals induced in the secondary coil 60 of the output transformer $T_0$, and they are obtained across the output terminals 5 and 6 of the amplifier 7 after amplified. On the other hand, one end of the primary coil 61 of the secondary transformer $T_2$ is connected to the output terminals of the respective gate circuits of the distributing circuit $D_0$ through respective direct current stopping capacitors 56, 56', 56'' . . . . The transformer $T_2$ functions as an element to cancel a spike voltage as well as a tuning element with respect to the output from the secondary coil 60, which will hereinafter be referred to.

Figure 2:
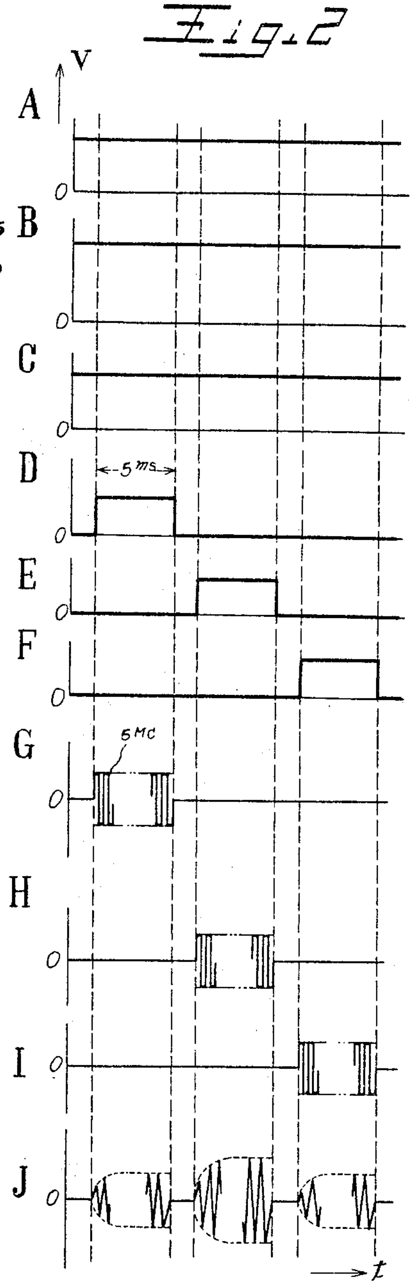
FIGURE 2 shows timing waves, for explaining the operation of the device shown in FIGURE 1.

When the selective command signals are successively impressed to the input terminals 42, 42', 42'' . . . of the distributing circuit $D_0$ at a constant time interval, the respective gate circuits D, D', D'' . . . are made conductive successively and driving signals from the rectangular wave power source 8 are introduced into the chopper circuits one after another at the said constant time interval. As a result of this, direct current signals which have been impressed respectively to the transmission lines are made to be alternating currents one after another, thereafter being amplified by the alternating current amplifier 7 and obtained across the output terminals 5 and 6 in order. This relationship will easily be clarified from the curves shown in FIGURE 2. That is, if now the direct current signals to be applied to the chopper circuits *ch*, *ch'*, *ch''* . . . are as shown in FIGURE 2–A, B, and C and the selective command signals to be applied respectively to the input terminals 42, 42', 42'' of the gate circuits D, D', D'' . . . of the distributing circuit $D_0$ are pulses of, for example 5 ms. having a time relationship such as shown in FIGURE 2–D, E and F, the outputs of the chopper circuits *ch*, *ch'*, *ch''* . . . are obtained in the form of alternating current signals the amplitude and the phase of which are determined according to the amount and the polarity of the direct current signal for the duration of the selective command signals as illustrated in FIGURE 2–G, H and I and the alternating current signals are then supplied through the transformers $T_0$ and $T_2$ to the alternating amplifier 7, obtaining such intermittent alternating current signals as shown in FIGURE 2–J. In this case, if the polarity of the direct current signal is opposite to that shown in FIGURE 2, the phase of the alternating signals to be obtained is reversed.

Figure 3:
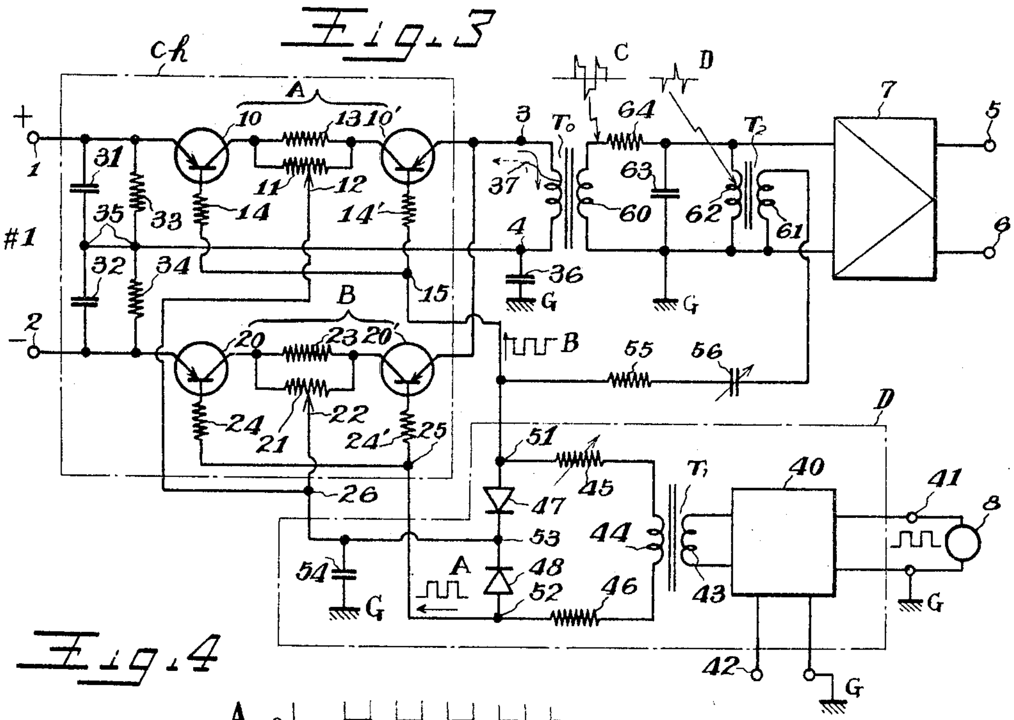
FIGURE 3 is an electric circuit diagram showing an embodiment of the device shown in FIGURE 1.

FIGURE 3 is an electric circuit diagram illustrating an embodiment of a signal switching circuit associated with the transmission line #1 in FIGURE 1, and its main circuit elements corresponding to those in FIGURE 1 are marked with the same numeral references, hence further explanation will be omitted. In FIGURE 3, a chopper circuit *ch* surrounded by the dotted line is composed of a first switch circuit A including pnp transistors 10 and 10' and of a second switch circuit B having pnp transistors 20 and 20'. That is, the collectors of the transistors 10 and 10' are interconnected through a parallel circuit of a potentiometer 11 and a fixed resister 13, and the bases are connected to a common connection point 15 respectively through resistors 14 and 14'. The collectors of the transistors 20 and 20' in the second switch circuit B are also interconnected through a parallel circuit of a potentiometer 21 and a fixed resistor 23 and the base are connected to a common connection point 25 respectively through resistors 24 and 24'. Driving signals of rectangular wave are introduced respectively to the switch circuits A and B respectively at the points 15 and 25, and the signal to the circuit A and that to the circuit B are controlled to be opposite in phase to each other. The emitters of the transistors 10 and 20 are respectively connected to the input terminals 1 and 2, and a series circuit of two capacitors 31 and 32 and another series circuit of two resistors 33 and 34 are connected in parallel to each other across the input terminals 1 and 2. Interconnection points 35 and 35 of the two series circuit elements are connected to one output terminal 4, which terminal is connected to the ground G through a capacitor 36. The emitters of the transistors 10' and 20' are both connected to the other output terminals 3. The gate circuit D includes an AND circuit 40 provided with a terminal 41 for output signals from the rectangular wave power source 8 to be impressed to and a terminal 42 for selective command signals to be applied to. To the output side of the AND circuit 40 is connected a primary coil 43 of a transformer $T_1$, and across the two terminals of a secondary coil 44 of the transformer $T_1$ are connected two constant-voltage diodes 47 and 48 (Zener diodes) which are connected in series with reverse polarity through resistors 56 and 46. A common connection point 51 of the resistor 45 and the constant-voltage diode 47 is connected respectively to the base common connection point 15 of the first switch circuit A and to a resistor 55, the other end of the resistor 55 being connected through a capacitor 56 to one end of the primary coil 61 of the transformer $T_2$. Another connection point 52 of the resistor 46 and the constant-voltage diode 48 is connected to the base common connection point 25 of the second switch circuit B, and a common connection point 53 of the two constant-voltage diodes 47 and 48 is connected respectively to a common connection point 26 of brushes 12 and 22 of the respective potentiometers of the two switch circuits A and B and to one end of a capacitor 54, the other end of the capacitor 54 being connected to the ground G.

Referring now to FIGURE 3, the operation of the circuit will hereinbelow be explained. When selective command signals such as shown in FIGURE 2–D, E and F are impressed into the input terminal 42 of the AND circuit 40, the AND circuit becomes conductive and driving signals from the rectangular wave source 8 are boosted by the transformer $T_1$ and applied across the two terminals 51 and 52 of the constant-voltage diodes 47 and 48. As a result of this, the driving signals are clipped at some amplitude, and at the same time two rectangular wave signals which are opposite in phase to each other with respect to the common connection point 53 are obtained across the electrodes of the respective constant-voltage diodes. These two driving signals are supplied across the base and the collector of the respective transistors of the first and second switch circuits A and B. Consequently, when the switch circuit A is conductive for the half cycle of the driving signal while the switch circuit B is non-conductive, direct current signals of the polarities + and − shown in the drawing are impressed across the input terminals 1 and 2 and these signals flow in the direction of the solid line arrow in the primary coil from the input terminal 1, through the switch circuit A, the primary coil 37 of the output transformer $T_0$, the capacitor 32 and the input terminal 2. For the next half cycle of the driving signal the switch circuit A is non-conductive and the switch circuit is conductive, and the aforesaid direct current signals flow in the direction of the dotted line arrow in the primary coil 37 from the input terminal 1 through capacitor 31, the primary coil 37, the switch circuit B and the input terminal 2. In the latter case, the voltage which has been charged in the capacitor 32 is discharged in the passage of the primary coil 37 and the switch circuit B and the discharged current flows in the direction of the dotted line arrow. Thus, the switch circuits A and B are turned on and off alternately every half cycle of the driving signal, and in response to this the direct current signals to be applied across the input terminals 1 and 2 are converted into alternating signals and then taken out across the terminals 5 and 6 after amplified.

Figure 4:
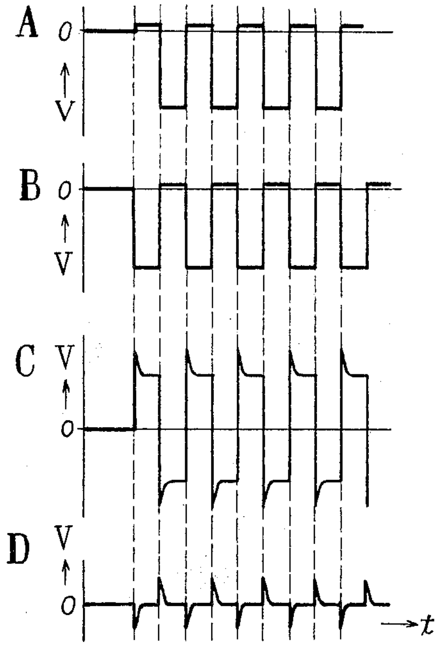
FIGURE 4 shows waveforms, for explaining the embodiment of this invention shown in FIGURE 3.

In this case, an output voltage to be induced in the secondary coil 60 of the output transformer $T_0$ appears in the form of a composite voltage waveform of a rectangular wave voltage the amplitude of which is in proportion to the amount of the input direct current signals and a large spike noise voltage to be produced by the capacity across the electrodes of the respective transistors of the switch circuits A and B (refer to FIGURE 4–C). On the other hand, the output rectangular wave signal of the gate circuit D shown in FIGURE 4–B is applied to the primary coil 61 of the transformer $T_2$ through a series circuit of the resistor 55 and the capacitor 56, and due to the differentiation by the inductance of the transformer $T_2$, a pulse voltage such as shown in FIGURE 4–D is produced across the secondary coil 62. Accordingly, by superposing the pulse voltage produced in the secondary coil 62 on the spike voltage of the output voltage induced in the secondary coil 60 of the output transformer $T_0$ in a manner that they are opposite in phase to each other and by adjusting the amount of the pulse voltage with the capacitor 56, the above spike voltage is removed.

FIGURE 4–A shows a curve of the rectangular voltage applied to the bases of the transistors 20 and 20', which makes the same conductive.

The transistors forming the switch circuits are connected in the inverted connection which is extremely effective for reducing spurious outputs, and the transistors to be paired must be uniform in characteristic. However, it is very troublesome to select such transistors which are uniform in characteristic, but in this invention such strict selection is not required, and it is possible that even if cheap transistors now on the market are used, the efficiency is not ever reduced. For example, if different residual voltages are produced across the emitters and collectors of the transistors 10 and 10' when they are conductive, there is produced a spurious voltage in accordance with the difference of the two residual voltages, but the deviation of the voltages may be reduced to be 0 by adjusting the brush 12 of the potentiometer 11. In a similar manner, the deviation of residual voltages in the transistors 20 and 20' may be made to be 0 by adjusting the brush 22 of the potentiometer 21. Furthermore, if there is a difference between leakage currents produced acros sthe emitters and the collectors of the transistors 10 and 10' when they are non-conductive, this difference currents merely flow through the other transistors 20 and 20' which are conductive and into the parallel circuit of the capacitors 31, 32 and the input signal source, which will be connected between the input terminals 1 and 2, and it does not flow directly to the primary coil 37 of the output transformer $T_0$ which is a load. As a consequence, various troubles such as the spike voltage, the spurious voltage and the like which are caused by the driving signals of the transistor choppers, can all be eliminated.

The chopper circuit *ch* in FIGURE 3 is formed in the so-called input balanced circuit structure in which the series circuit of the two capacitors 31 and 32 and the other series circuit of the two switch circuits A and B are connected respectively in parallel between the input terminals 1 and 2, and a load such as the primary coil 37 of the output transformer $T_0$ is connected between the interconnection points of the series circuits. Hence the common mode voltage rejection ratio may be made large to such an extent as from $1\times10^6$ to $1\times10^7$ or so.

In the example of this invention such as shown in FIGURE 3, when minute signals of an input voltage 0–10 mv. were converted into alternating current signals, the noise level including the drift could be made lower than 10 $\mu$v. The frequency of the driving signals was 5 kc. in this case.

As has been described above, in this invention chopper circuits are separately inserted in many transmisison lines which are terminated with respective primary coils of output transformers wound on the same core, and particular one of the chopper circuits is selectively driven to convert a direct current signal applied to the chopper circuit into an alternating current signal and the alternating current signals amplified successively by a common alternating amplifier connected to the secondary coil of the output transformer $T_0$, so that the whole device may be simplified and devices of excellent efficiency may be produced cheaply.

It will easily be understood that this invention is not restricted to the foregoing examples. For example, as the chopper circuits *ch, ch'* . . . in FIGURE 1 ordinary mechanical choppers may be used other than the transistor choppers exemplified in FIGURE 3. Furthermore, in the examples the input signals to be applied to the respective transmission lines are direct current, but it is possible to use alternating current signals at a frequency sufficiently lower than the driving signal frequency of the chopper circuits.

It will be apparent that many modifications and variations may be effected without departing from the scope of the novel concept of this invention.

What is claimed is:

1. An electrical signal switching device comprising an output transformer composed of a plurality of primary coils and a secondary coil wound on the same core, a plurality of signal transmission lines respectively terminated with the primary coils of said transformer, a plurality of chopper circuits respectively inserted between said transmisison lines and respective primary coils of said transformer, and a plurality of gate circuits connected respectively to said chopper circuits for supplying driving signals thereto, said gate circuits being selectively operated by selective command signals so that said chopper circuits are successively operated by said driving signals from said gate circuits, thereby converting respective input signals applied to said chopper circuits into alternating current signals successively.

2. A signal switching device as claimed in claim 1, comprising a first and a second electrically driven switch crcuits, each composed of a pair of transistors in inverted connection, means for connecting said two switch circiuts in series and for connecting the both terminals of said series circuit to input terminals, means for connecting in parallel two capacitors connected in series to each other to the series circuit of said two switch circuits, and means for connecting a load between the interconnection point of said two switch circuits and that of said two capacitors, said first and second switch circuits including chopper circuits to be turned on and off alternately by driving signals which are opposite in phase to each other.

3. A signal switching device as claimed in claim 1, comprising means for differentiating the rectangular wave signals which drive said chopper circuits by an inductance element, said differentiated pulse voltage being overlapped on the output signals of said chopper circuits in such a manner that they are antiphase with respect to the output signals.

No references cited.

JOHN F. COUCH, *Primary Examiner.*

M. WACHTELL, *Assistant Examiner.*